US008127142B2

United States Patent
Cuppett

(10) Patent No.: US 8,127,142 B2
(45) Date of Patent: Feb. 28, 2012

(54) METHOD OF AUTHENTICATING A USER ON A NETWORK

(75) Inventor: Steven C. Cuppett, Tampa, FL (US)

(73) Assignee: University of South Florida, Tampa, FL (US)

( * ) Notice: Subject to any disclaimer, the term of this patent is extended or adjusted under 35 U.S.C. 154(b) by 1054 days.

(21) Appl. No.: 11/530,565

(22) Filed: Sep. 11, 2006

(65) Prior Publication Data

US 2010/0250957 A1  Sep. 30, 2010

Related U.S. Application Data

(60) Provisional application No. 60/596,231, filed on Sep. 9, 2005.

(51) Int. Cl.
  G06F 17/30 (2006.01)
  G06F 21/00 (2006.01)
  H04L 29/06 (2006.01)
(52) U.S. Cl. ........ 713/186; 713/182; 713/184; 713/185; 726/9
(58) Field of Classification Search ............... 713/186
  See application file for complete search history.

(56) References Cited

U.S. PATENT DOCUMENTS

| 5,850,450 | A   |   | 12/1998 | Schweitzer et al. |
|-----------|-----|---|---------|-------------------|
| 6,044,155 | A   |   | 3/2000  | Thomlinson et al. |
| 6,176,613 | B1  | * | 1/2001  | Chen ................................. 383/3 |
| 6,311,272 | B1  | * | 10/2001 | Gressel .......................... 713/186 |
| 6,484,259 | B1  |   | 11/2002 | Barlow |
| 6,836,843 | B2  |   | 12/2004 | Seroussi et al. |
| 7,076,062 | B1  |   | 7/2006  | Spies |
| 7,549,161 | B2  | * | 6/2009  | Poo et al. .......................... 726/5 |
| 2002/0095587 | A1 | * | 7/2002 | Doyle et al. .................. 713/186 |
| 2002/0180584 | A1 | * | 12/2002 | McGregor et al. ........... 340/5.26 |
| 2004/0123113 | A1 | * | 6/2004 | Mathiassen et al. .......... 713/185 |
| 2004/0124246 | A1 | * | 7/2004 | Allen et al. .................... 235/492 |
| 2004/0188519 | A1 | * | 9/2004 | Cassone ........................ 235/382 |
| 2005/0015588 | A1 | * | 1/2005 | Lin et al. ....................... 713/159 |
| 2005/0050330 | A1 | * | 3/2005 | Agam et al. .................. 713/172 |
| 2005/0125668 | A1 |   | 6/2005 | Botz |
| 2005/0182927 | A1 | * | 8/2005 | Shatford ....................... 713/159 |
| 2005/0187883 | A1 | * | 8/2005 | Bishop et al. .................. 705/67 |
| 2005/0229006 | A1 | * | 10/2005 | De Moura et al. ............ 713/186 |
| 2005/0273626 | A1 | * | 12/2005 | Pearson et al. ................ 713/186 |
| 2006/0016876 | A1 | * | 1/2006 | Bonalle et al. ................ 235/380 |
| 2006/0036872 | A1 | * | 2/2006 | Yen ............................... 713/183 |

(Continued)

OTHER PUBLICATIONS eToken, "eToken Overview," Dec. 2004, Aladdin Knowledge Systems Ltd., pp. 14-50.*

(Continued)

*Primary Examiner* — Luu Pham

(74) *Attorney, Agent, or Firm* — Nilay Choksi; Courtney M. Dunn; Smith & Hopen, P.A.

(57) ABSTRACT

A method of controlling access to electronic information is provided. The method requires the use of a portable token adapted to read and verify a user's biometric data in order to view encrypted files or data fields. If the proper biometric data is entered into the token, the user is presented with a unique and dynamic password for logon. The unique password is displayed on a small LCD screen on the token. Access to the protected information is allowed once the unique password is verified by the enterprise system containing the encrypted.

9 Claims, 5 Drawing Sheets

U.S. PATENT DOCUMENTS

2006/0225126 A1* 10/2006 Brown et al. .................... 726/2
2006/0229988 A1* 10/2006 Oshima et al. ................. 705/50
2007/0006322 A1* 1/2007 Karimzadeh et al. ........... 726/27
2007/0033320 A1* 2/2007 Wu et al. ....................... 711/100
2007/0040017 A1* 2/2007 Kozlay ......................... 235/380

OTHER PUBLICATIONS

IA Architecture Office, "Global Information Grid Information Assurance Capability/Technology Roadmap," Oct. 2004, National Security Agency, pp. 35-48.*

* cited by examiner

METHOD OF AUTHENTICATING A USER ON A NETWORK

CROSS REFERENCE TO RELATED APPLICATIONS

This application claims priority to currently pending U.S. Provisional Patent Application 60/596,231, filed Sep. 9, 2005; which is incorporated herein by reference.

FIELD OF INVENTION

This invention relates to the field of electronic information security, specifically a hardware-based authentication system.

BACKGROUND OF THE INVENTION

Reports of computer security breaches involving compromised personal or confidential information are all too frequent. For example, the May 6, 2005 issue of *The Chronicle of Higher Education* lists 14 separate incidents involving major higher-education institutions within the span of a couple of months. The problem is not confined to higher-education institutions, but affects all industries (government, banking health care, etc.), and home computer users as well.

Computer security and identity theft are the most pressing issues of the information age and generate tremendous collective anxiety among executives, IT professionals, and home users alike. Moreover, legislation relating to privacy and security of information (e.g. Gramm Leach Bluely Act (GLB), Health Insurance Portability and Accountability Act (HIPAA), Family Educational Rights and Privacy Act (FERPA), etc.) continue to tighten, while the severity of penalties for non-compliance continues to increase. In the present climate, even the slightest of security breaches can do serious damage to an organization's reputation or bottom line, leaving their customers' financial affairs and/or expectations of privacy completely shattered.

Attempts to solve problem have focused on continued efforts to harden security over confidential and personally-identifiable information contained within enterprise systems; but these solutions do not appear sufficient as breaches continue to occur at an alarming rate. Therefore, a solution is needed to create additional protections to the existing control regimes; yet at the same time be easy to use, rapidly deployable and highly cost-effective. More specifically what is needed is a cost-effective solution that will effectively render sensitive data that may be lost, or stolen, useless to an unauthorized recipient.

SUMMARY OF INVENTION

The present invention provides end-to-end field level encryption for all electronic data residing within fields deemed confidential or personally identifiable (social security numbers, bank account numbers, credit card numbers; customer names, telephone numbers, and addresses, etc.). Protection under the inventive system extends for the data in storage as well as during transmission across a network. Employing such "perpetual" encryption on all confidential and/or personal identifier fields does not effect normal enterprise systems processing, and can be achieved using a variety of existing tools.

Additionally, the inventive system employs a powerful and highly secure, yet extremely cost-effective, authentication/decryption device issued to users authorized to view, update, or print confidential enterprise data in unencrypted form; whereas none of the encrypted fields can be decrypted and/or viewed without the device.

An embodiment of the invention includes a method of authenticating a user on a network including the steps of connecting a portable security token to a client on a network via a USB, serial or other connection known in the art. The token has a dynamic secret generation mechanism, a biometric data input such as a fingerprint reader, a biometric data authentication mechanism and a decryption key. Biometric data, such as the fingerprint, is imprinted into the security token for at least one user. This imprinting may be permanent so that the biometric data may not be overwritten and thus compromise the security of the system. A secret PIN, password or other such code is generated upon authentication of the biometric data by the biometric authentication mechanism. The secret is transmitted to a server having a corresponding secret authentication mechanism. Encrypted data is then transmitted from the server to the client responsive to an authenticated secret. The decryption key on the token decrypts the data received from the server and permits its display on the client. The portable security token may further include a readout such as a LCD display adapted to display the secret generated by the token. After a predetermined timeout value, the secret is cleared from the readout to prevent unintended viewing. The decryption key is maintained exclusively on the token and is not transferred to the network client. Decrypted data reverts to an encrypted state responsive to a connection break between the client and the decryption key on the token. The encryption scheme may deploy asymmetric cryptology. The portable token is tamper resistant, specifically, it is stored in an air pressurized automatic degaussing container.

The portable security token apparatus itself includes a connector adapted to communicatively engage a computer, a processor communicatively coupled to the connector, a non-volatile memory module communicatively coupled the processor, a biometric input communicatively coupled to the processor and the non-volatile memory, a readout communicatively coupled to the processor, a biometric data authentication mechanism communicatively coupled to the processor and adapted to compare data from the biometric input to data stored in the non-volatile memory, a dynamic secret generator communicatively coupled to the processor and adapted to create an authentication secret responsive to a positive match between data entered from the biometric input and data stored in the non-volatile memory and a decryption key communicatively coupled to the processor. The token body is pivotally connected to the connector to facilitate end user viewing of the readout.

BRIEF DESCRIPTION OF THE DRAWINGS

For a fuller understanding of the invention, reference should be made to the following detailed description, taken in connection with the accompanying drawings, in which.

DETAILED DESCRIPTION OF THE PREFERRED EMBODIMENT

In the following detailed description of the preferred embodiments, reference is made to the accompanying drawings, which form a part hereof, and within which are shown by way of illustration specific embodiments by which the invention may be practiced. It is to be understood that other embodiments may be utilized and structural changes may be made without departing from the scope of the invention.

Client computer 20 commonly operates in a networked environment using logical connections to one or more additional remote computers, such as similar remote computers, routers, networked PCs, peer devices or other common network nodes. In an exemplary embodiment, client computer 20 is in bidirectional communication with server 30. Examples of logical connections include local area networks (LAN) and wide area networks (WAN); which are known. Such networks connections are well known in the art and other means of establishing communication between the computers may be used without deviating from the scope of the invention.

Client computer 20 has at least one port to accept a portable security token connection; i.e. a universal serial bus (USB) or serial port. A security token (also referred to as an authentication token) is a portable hardware device that the user carries to authorize access to network resources. The token may be in the form of a smart card or may be embedded in a commonly used object such as a key fob. Security tokens provide an extra level of assurance through a method known as two-factor authentication: the user has a personal identification number (PIN), which authorizes them as the owner of that particular device; the device then displays a number which uniquely identifies the user to the service, allowing them to log in. The identification number for each user is changed frequently. Unlike a password, a security token is a physical object. A smart card, for example, is practical and easy to carry, and thus, easy for the user to protect. Even if the smart card falls into the wrong hands, however, it can't be used to gain access because the PIN (which only the rightful user knows) is also needed. A discussion of the use of smart cards is contained in U.S. Pat. No. 7,076,062 which is incorporated herein by reference.

Figure 1:
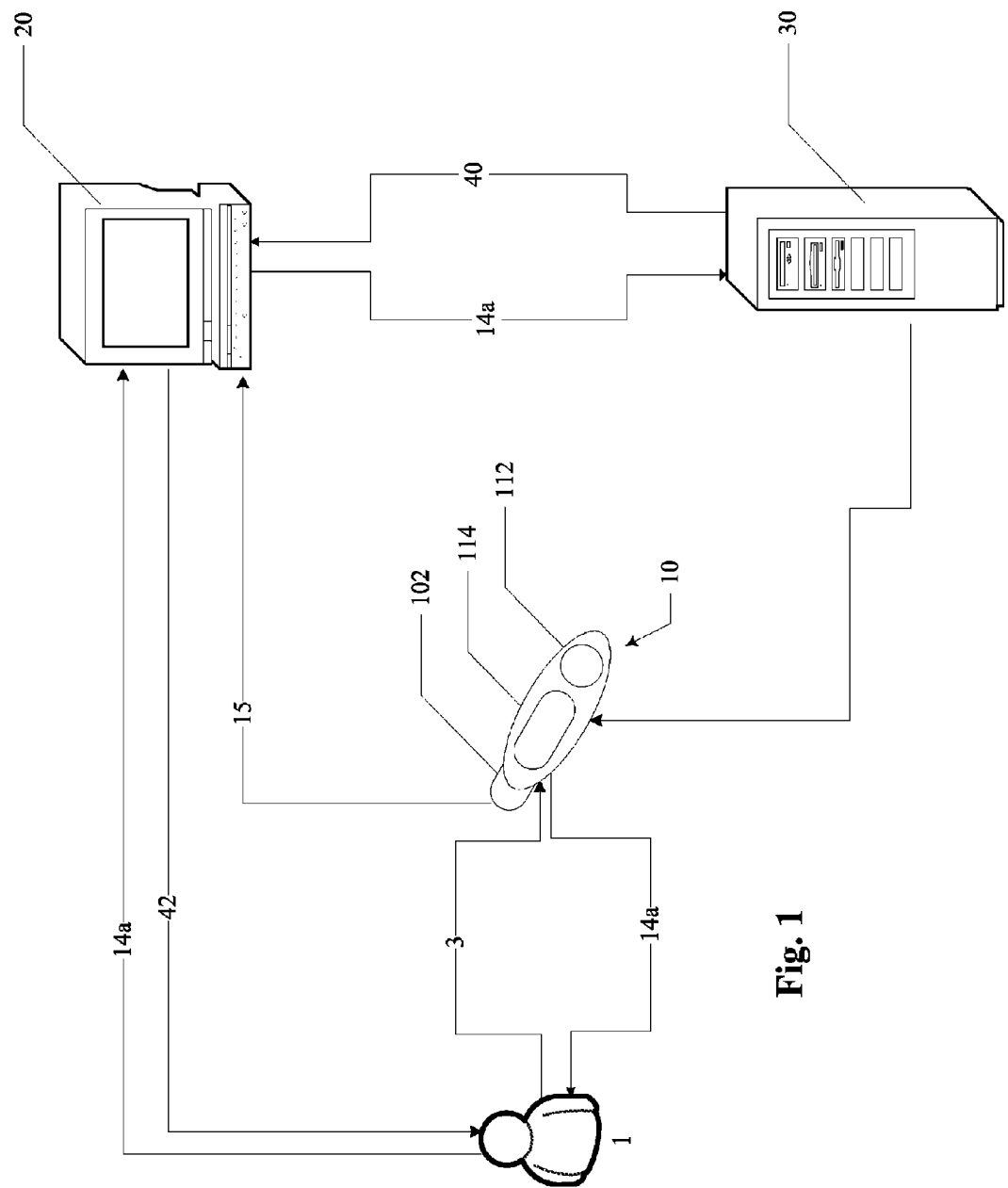
FIG. 1 is a flowchart of data flow through the inventive system.

FIG. 1 is a diagram of information flow through the inventive system. In this illustrative embodiment, user 1 connects portable token 10 to client computer 20. Client computer 20 is equipped with a port to receive connector 11 on token 10. Upon receiving a logon prompt, user 1 places a finger on sensor 16 to input biometric identity data 3. A unique secret 14a (usually comprising a password or personal identification number (PIN)) is displayed on screen 17 if the property identity data (3) is supplied.

User 1 then enters secret 14a into the logon screen through client computer 20 which is then sent to server 30. Encrypted data 40 is then sent to client computer 20 only if secret 14a matches the value anticipated by server 30.

Once encrypted data 40 is received by client computer 20, decryption key 15 on token 10 allows the encrypted data to be viewed as long as the connection between token 10 and client computer 20 is maintained. Decryption key 15 remains on token 10 is not stored in the active memory of client 20 or server 30.

Figure 2:
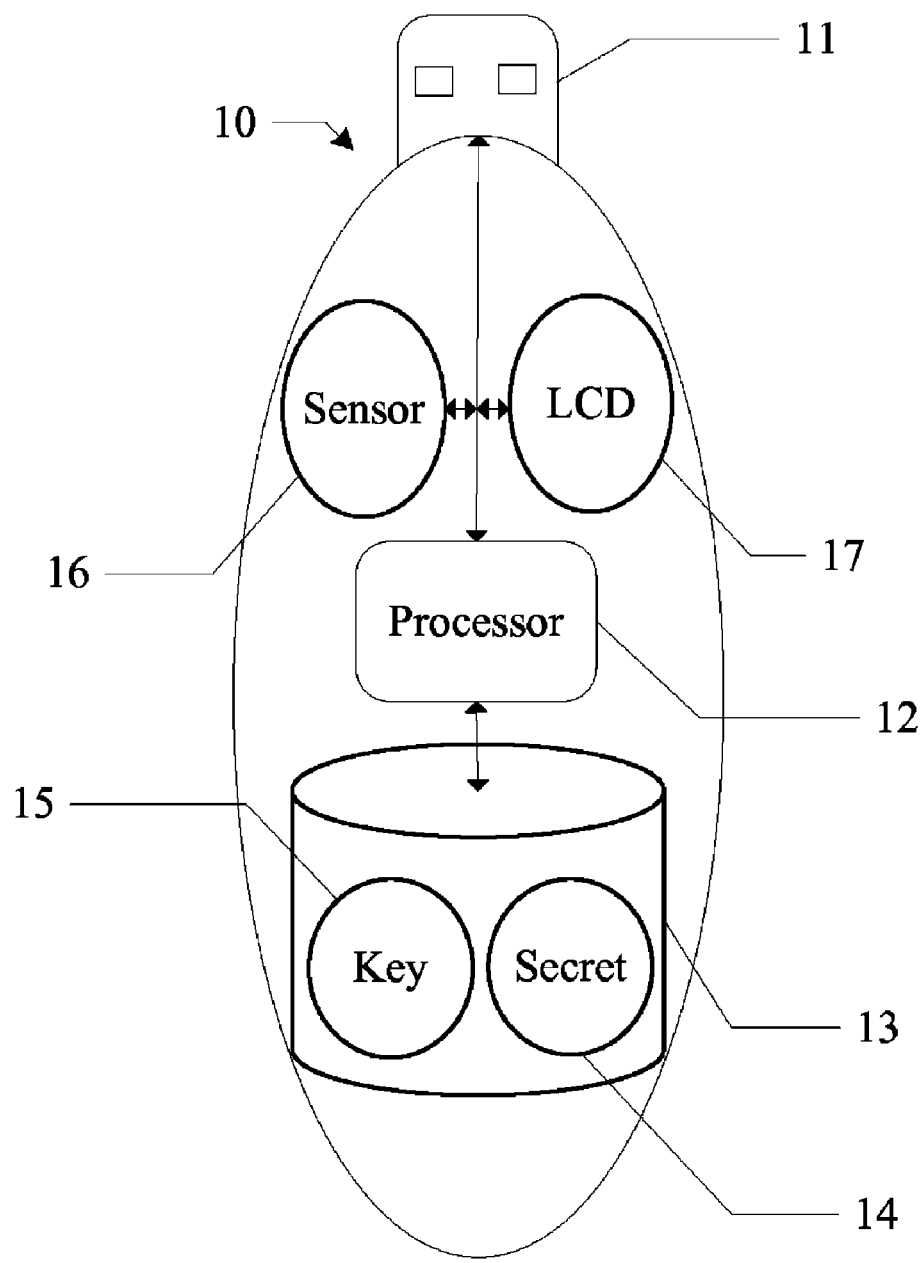
FIG. 2 is a block diagram of an illustrative portable token.

FIG. 2 is a block diagram depicting an exemplary token having a USB interface. Here, token 10 includes USB connector 11 capable of connecting to a standard USB (preferably USB 2.0) port on a computer. Connector 11 is coupled with token-processor 12 which is likewise coupled to non-volatile token-memory 13. Non-volatile token-memory 13 enables token 10 to be connected to multiple computers without the loss of data in memory. Token-processor 12 receives its instructions from firm-ware stored in token-memory 13 as well as from the client computer to which token 10 is attached.

Illustrative firm-ware for use with token 10 includes, inter alia, auto-run and auto-start programs as well as decryption key 15 and secret generator 14. Decryption key 15 is preferably stored on token 15 and is otherwise isolated from the network, including the client computer.

Token 10 also includes biometric sensor 16 and LCD display 17. Biometric sensor 16 is communicatively coupled to processor 12 and memory 13 which stores the individual user's unique identifying material; i.e. fingerprint.

In use, the user enters the necessary biometric information (fingerprint) on sensor 16. Processor 12 then compares the input against the stored data representing the assigned user's information. Secret generator 14 then creates a new secret (i.e. PIN/Password) only if the information from sensor 16 matches the data in memory 13. If a new secret is generated it is displayed on screen 17.

In one embodiment, connector 11 is pivotally attached to the body of token 10; thereby allowing the rotation of the body of token so screen 17 can be more easily read. Token 10 of a preferable embodiment is permanently sealed to make it tamper resistant. In this embodiment, any attempt to open the case of token 10 would destroy one or more components inside making token 10 unusable. For example, a filament attached during assembly is adapted to activate an electromagnet, thereby erasing data, if the sides of the case are separated and the filament broken. It is also preferable to construct the case of token 10 from a durable material as well as impervious to viewing via x-ray or similar technology. This precaution prevents any attempt to record and capture the contents of the decryption key from outside the case.

Figure 3:
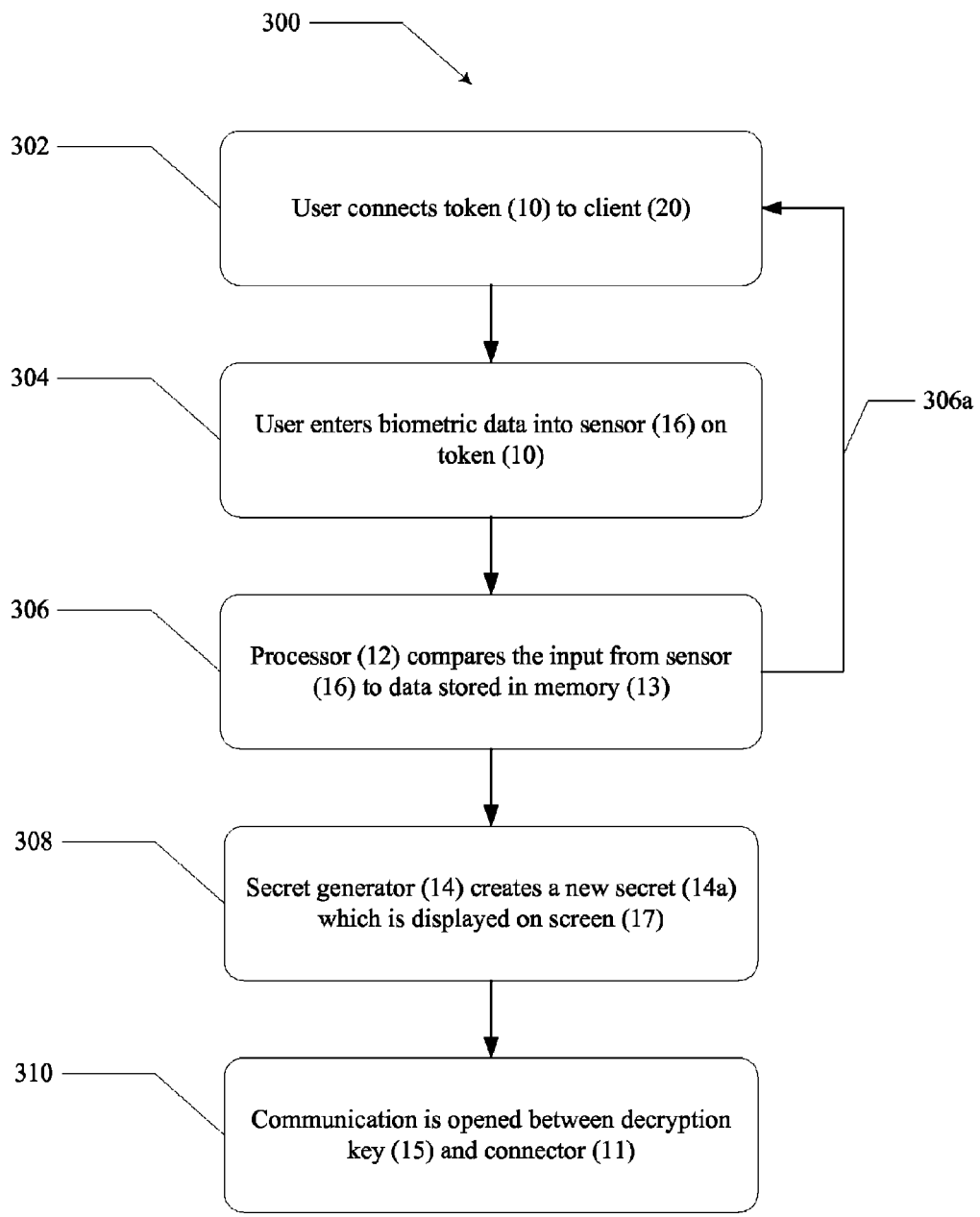
FIG. 3 is a block diagram of the initialization step.

FIG. 3 is a block diagram depicting the connection process 300 between client 20 and token 10. In step 302, the user connects token 10 to client 20, which is in turn connected to server 30 across a network. In step 304, user enters the necessary biometric data into sensor 16 such as by placing his/her finger thereon and initializing activation. In step 306, processor 12 compares the input from sensor 16 to data stored in memory 13. In step 308, assuming a positive match from step 306, secret generator 14 creates a new secret (14a) such as a password or personal identification number (PIN) for the new session which is then displayed on screen 17. Secret generator 14 can use any number of known methods for generating secret 14a and can provide new secrets based on any number of predetermined criteria, for example responsive to time (new password every minute) and/or per session. The process ends, requiring reinitialization, if no match is found between the biometric input and stored biometric data is step 306.

In step 310, communication is opened between decryption key 15 and connector 11; thereby allowing encrypted data on client computer 10 to be seen. In a preferred embodiment, screen 17 automatically disconnects shortly after activation so that it becomes blank (obscuring the previous password) and requires a new initialization sequence to obtain an updated secret Likewise, the decryption key-to-connector link should automatically disconnect whenever token 10 is unplugged or client 20, to which it is attached, is turned off or otherwise loses power.

Figure 4:
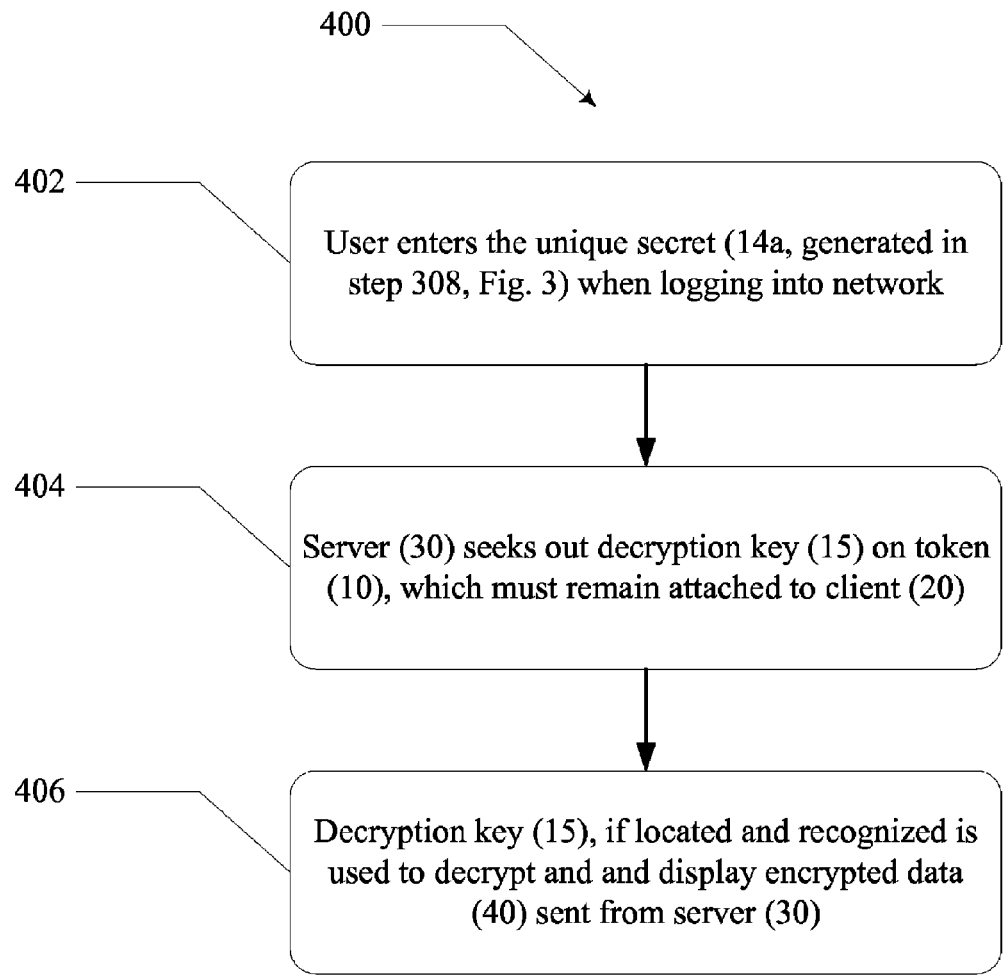
FIG. 4 is a block diagram of the authentication step.

FIG. 4 is a block diagram depicting the connection process 400 between token 10, through client 20, and server 30 across a network. In step 402, the user enters the unique secret (generated in step 308, FIG. 3) when logging in. A successful login occurs where there is an exact match between the network access control list and the token-software on server 30.

Successful login allows the user to have access to the encrypted data 40 on server 30.

In step 404, server 30 seeks out decryption key 15 on token 10, which must remain attached to client 20. In Step 406, decryption key 15, if located and recognized, is used to decrypt and display encrypted data 40 sent from server 30. Decryption key 15 is not transferred to the active memory of client 20 but is instead used by the enterprise system to display protected data through the open connection with token 10. Removal of token 10 breaks the open connection and immediately reverts any encrypted data to a non-viewable status.

In the preferred embodiment, decryption key 15 should not reside anywhere on the network and is limited only to the finite population of issued tokens (10). Encrypted data (40) is not readable or otherwise viewable in any data exported from server 30 to any application (i.e. via email) since decryption key 15 on connected token (10) does not transfer along with the data. In such a scenario, the recipient of the email would also need an authorized token to view the encrypted information.

Figure 5:
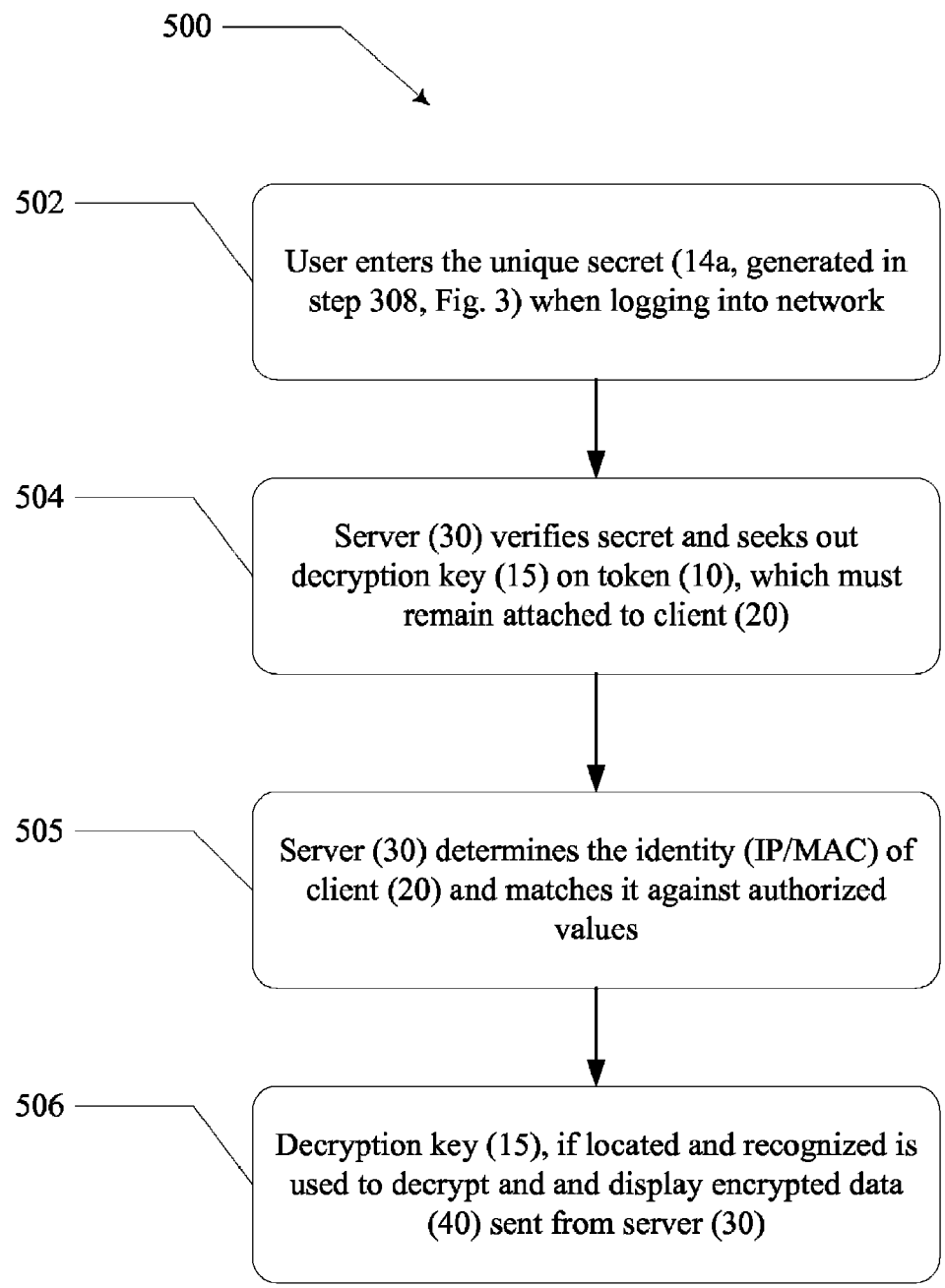
FIG. 5 is a block diagram of an alternative embodiment of the authentication step.

FIG. 5 is a block diagram depicting an alternate embodiment of the connection process 500 between token 10, through client 20, and server 30 across the network. This embodiment further comprises Step 505, which provides four-factor authorization by determining the identity and location of client 20. Here, server 30 verifies the identity and location of client 20 in addition to the authentication criteria of step 504. The authentication of step 505 can be achieved, for example, by determining the IP address of client computer 10 or the MAC number from the hardware thereon. Authentication would require a match between the value received and a list of authorized values on server 30.

Encryption Methodology

A preferred embodiment of the authentication/decryption system employs an asymmetric encryption system (public key/private key pair). As such, the enterprise system deploying the solution uses a unique public key to encrypt confidential enterprise data fields (end-to-end). A unique private key, which resides on the portable token, is needed for decrypting the confidential data fields.

Asymmetric, or public key, cryptography is a form of cryptography which allows users to communicate securely without having prior access to a shared secret key. This is done by using a pair of mathematically related cryptographic keys, designated as the public key and the private key. The private decryption key is kept secret as it resides nowhere except on the portable token. The public key, however, may be distributed across the enterprise system.

Examples of known asymmetric encryption systems that can be used with the inventive system include but are not limited to Diffie-Hellman, DSS (Digital Signature Standard) which incorporates the Digital Signature Algorithm, ElGamal, elliptic curve techniques, password-authenticated key agreement techniques, Paillier crypto-system and RSA encryption algorithm (PKCS). Further examples and discussion related to encryption techniques capable of use in the inventive system can be found in numerous texts such as *Applied Cryptography: Protocols, Algorithms, and Source Code in C, Second Edition*, by Bruce Schneier, published by John Wiley & Sons, Inc. 1996; *The Handbook of Applied Cryptography*, by Alfred J Menezes et al., published by CRC Press, LLC 1997; and *Public Key Cryptography—PKC 2005: 8th International Workshop on Theory and Practice in Public Key Cryptography*, by Serge Vaudenay (Editor), published by Springer, 2005; which are incorporated herein by reference.

Token Design

A loading device imports the chosen decryption key and authorized user fingerprint into the memory of the portable token prior to issuance and activation. For added security reasons, the token can be designed to break off the sole loading connection once the fingerprint data is loaded so that the token cannot be reprogrammed with a new fingerprint. The loading device can also keep track of all load activity, i.e. registering a unique internal serial number from each device.

For multiple enterprise systems with sensitive data, synchronization of access control lists and matching token software among the various host systems is necessary where it is desirable for each user to access multiple systems concurrently without having to remove and reconnect a different authentication/decryption token for each unique system. Alternatively, the authentication/decryption device should also work with any "single sign-on" solutions (users log in once and then can access multiple enterprise systems).

While fingerprint authentication is the most feasible biometric method, more sophisticated methods, such as voice authentication or eye recognition (iris or retina), are contemplated. Access to systems, or attempted access to systems, where the presence of an authentication/decryption device is detected should be automatically logged and reported.

In one embodiment, the token comprises a tamperproof air pressurized automatic degaussing container. A small magnetic data storage mechanisms within the device is mounted to an on/off magnetic platform (similar to apparatus used on machine shop equipment to hold metal stock or parts in place during machine work. Called magnetic chucks, these devices (some require power source, some do not) generally consist of a platform with a flat metal surface and on/off handle) having an activating switch-arm of non-metallic material that protrudes upward. This on/off magnetic mounting platform in turn is affixed to an overall inner-mounting assembly. On the end of the magnetic platform's activating switch arm is a thin flap of non-metallic material (plastic, rubber, stiff paper, etc). The on/off magnetic platform remains de-magnetized throughout the manufacture, delivery, and normal usage of the device.

A small air-tight container serves as the exterior housing for the mounting assembly. Shapes and materials vary, but a preferred embodiment comprises an elongated spherical container molded of a non-transparent hard plastic in two pieces that mate together with screw threads at the connecting joint with a double O-ring seal to establish and maintain the airtight integrity upon final assembly.

The inner mounting assembly should be designed to fit into the container once all attached components are in place and, on insertion, the on/off magnet platform should purposefully rest in such a position on the inner mounting base so that the magnetizer activating switch arm flap is parallel to (on the same plane as) the inner wall of the container; without actually touching the inner wall. In order for signals/data streams to flow in and out of the device, fixed pass-through terminals are molded into one end (the cap side) of the container, terminating in receptacle plugs on either side (inner and outer wall), hereafter collectively referred to as the in/out junction. All necessary connecting wiring from inside the device is bound in a wiring harness (to be held in place by clips) that terminates in a plug that is inserted into the inner wall receptacle just before the container is sealed.

A small temporary opening in the container (on the opposite side from the magnet activation arm and flap) allows a compressed air filler nozzle to be inserted on final assembly. The filler nozzle is used to propel compressed, dried air (gradually so as not to disturb the contents) into the container to achieve a pressurization level sufficient to drive and hold the flap on the magnet activation flap arm against the inner wall of the container. This activates a spring-loaded cocking mechanism arm assembly.

The filler nozzle mechanism used on line-assembly, upon extraction, applies an expanding patch (similar to the way an internal tire plug or patch is installed) held into place by the air pressure. The patch seals the inserted pressure within the container. Release of this pressure (beyond a minimal long-term degradation), such as from tampering, would no longer hold the magnetizer activation arm flap against the inner wall and cause the cocked-arm top the magnetizer on/off switch to the on position. This generates a magnetic field sufficient to permanently erase (degauss) all sensitive data contained on the attached data storage devices (in this case decryption key and biometric data).

The circuitry configuration of the token incorporates relaying processes and built-in interruptions to block any direct electronic access to sensitive and proprietary data stored on magnetic storage devices inside the tamper-proof air pressurized automatic degaussing container. The small magnetic storage devices within the "egg" that contain sensitive and/or proprietary information (encryption key, filed biometric, token algorithm) are not linked directly to the in/out junction, in order to prevent unauthorized attempts to read the contents electronically. Instead, the storage device(s) containing the sensitive data that will eventually be needed on the outside (decryption key and token generated PIN in this instance) are linked to the in/out junction via a wire or circuit that is interrupted by a switch. These switches remain open by default and can only be triggered (closed) via an electronic signal generated from inside the device (as explained below).

A series of micro-processing devices (nip) are mounted on or near the on/off magnetic mounting platform, and connect to a common power strip that receives the measured level of power necessary through the USB connection (via a wire to the in/out junction); with the sole exception of the token PIN generator that runs all the time and should be powered by a small long-life battery contained within the container. Only one nip should be designated for receiving signals/data-streams from outside (such as a biometric read from sensor on the outside of the authentication/decryption device), upon receiving a power-up signal through the sole connecting wire or circuit attaching it to the in/out junction and eventually the read activation trigger on the exterior of the device. This initial nip has no direct connection to the storage devices, only one more wire or circuit attaching it to another nip on the mounting base. The initial receiver nip first checks to see that the expected signal or data stream is in the expected and desired format (fingerprint biometric measurements for example, and not an attempt to reprogram or redirect). If the expected format is not received, the nip would powers down and overall device operations ceases. If the expected format is received, the nip opens a relay or switch between itself and the next nip, directing the next nip to power up and send the signal/data stream to the next nip, and then power itself down.

In this manner, by using multiple micro-processing devices and a series of relaying actions, switches, etc., nip's that are not connected with the in/out junction pass the incoming streams (biometric measurement in this case), retrieve the biometric on file in the separate storage device(s), and further along in the process perform the match/not matched test. The test results (yes/no), but not the sensitive data (filed biometric) are passed on to the last nip. If the results are yes, the last nip closes the switch to the visual LCD display on the token, displaying the current valid secret. When (or if) the last nip receives the correct signal from enterprise software through the USB connection with the attached client (that PIN received from token at login was successfully matched), this last nip sends a signal to close the switch in the wire or circuit existing between the storage device containing the decryption key and the in/out junction.

With this switch closed, the enterprise system software can access the decryption key through the USB connection (and verify a unique internal device serial number also present with or linked to the decryption key, providing the opportunity to permanently block system access for devices reported missing or stolen) and use it (in random memory that would be lost again when the computer powers down) to display unencrypted confidential data in views on the user machine. The switch between the decryption key and in/out junction on the container should be configured to automatically open back-up (disconnecting the decryption key) if the connection through the USB port to the CPU is interrupted, either by removal of the device or power-down of the machine. The switch that activates the visual LCD display is configured to automatically open again after a short period of time so that the currently valid secret can no longer be seen.

Random memory on any of the nips containing biometric data are lost whenever power through the USB is disrupted; as would the incoming biometric read(s), and the programming within the device should be such that new incoming biometric read(s) from new sessions would simply "write over" the previous reads. The decryption key itself has no physical connection to this process, staying on its own small magnetic storage device and having only the one switched link through which the enterprise system can access it, and will be immediately and permanently erased by the magnetic field upon even the slightest tampering, as would the flied biometric that is also being stored on a separate small magnetic storage device.

The token also comprises a one-time only, "fused" external loading link to small magnetic storage devices inside the tamper-proof air pressurized automatic degaussing container. The decryption key and biometric data are loaded onto each token by a separate loading device. As such, the circuit enabling the initial load is permanently disabled once that initial load is verified and complete. The initial load wires connecting to the small magnetic storage devices within, the container (though the in/out junction and USB) include within their span a section of lighter wire that acts as a fusible link. Once the load has been performed, and verified, the loading device electronically triggers a switch near the connection of the load wire and storage device that protects the device as the loader also sends an electronic current down the loading wires that is just sufficient to "bum-oft" the lighter wire (section should be encapsulated with glass capsule or other material sufficient to prevent expanding burn damage or smoke contamination within the "egg"); thereby permanently breaking off the connection. The loading device also has a built in resistance meter that would verify that the connection was broken prior to detachment from the authentication/decryption device.

It will be seen that the advantages set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall there between. Now that the invention has been described,

What is claimed is:

1. A portable token, comprising:
a connector to connect with a client computer; and
a body, connected to the connector, the body having
a biometric sensor to receive biometric identity data of a user,
a non-volatile memory storing biometric identity data of an enrolled user, a decryption key, and instructions to generate a secret,
a processor, communicatively coupled to the biometric sensor and the non-volatile memory, to compare the received biometric identity data against the biometric identity data of the enrolled user and to execute the instructions to generate the secret responsive to a positive identification of the received biometric identity data of the user,
a display communicatively coupled to the processor to display the secret, wherein the secret is disappeared after a predetermined timeout value, and
a switch communicatively coupled to the portion of the non-volatile memory containing the decryption key and the connector, wherein the switch allows access to the decryption key only when an indication is received from the client computer indicating that the secret was positively identified and there is an active connection between the portable token and the client computer; otherwise, denies access to the decryption key wherein the decryption is used to decrypt encrypted data received from a server computer, the decryption key is stored on the portable token and never stored in any non-volatile memory of the client computer or the server computer.

2. The portable token of claim 1, wherein the portable token is tamper resistant.

3. The portable token of claim 1, wherein the body of the portable token is an air pressurized automatic degaussing container.

4. The portable token of claim 1, further comprising a loading logic, communicative coupled to the non-volatile memory, to receive biometric identity data of the enrolled user.

5. The portable token of claim 4, wherein the loading logic is permanently removable from the portable token.

6. The portable token of claim 1, wherein the processor comprises a series of micro-processing devices.

7. A method of authenticating a user on a network using a portable token, the method comprising:
establishing a physical connection between the portable token and a client computer on the network;
receiving, by a biometric sensor embedded on the portable token, biometric identity data of a user;
comparing the received biometric identity data against stored biometric identity data of an enrolled user;
generating a secret responsive to a match between the received biometric identity data and the stored biometric identity data of the enrolled user;
displaying the secret on the display embedded on the portable token that enables the user to input the secret using an input device of the client computer, wherein the secret is disappeared after a predetermined timeout value;
sending, by the client computer, the secret to a server;
receiving encrypted data from the server, responsive to the secret being authentic;
allowing the client computer to access a decryption key stored on the portable token only when the client computer indicates that the secret was positively identified and there is an active connection with the client computer; wherein the decryption key is stored on the portable token and never stored in any non-volatile memory of the client computer or the server computer;
accessing a decryption key located only on the token through the connection with the token, responsive to the secret being authentic and receiving encrypted data;
decrypting the encrypted data using the decryption key only while the connection with the token is active; and
displaying the decrypted data on a display of the client computer.

8. The method of claim 7, wherein the server receives the secret, determines if the secret is authentic, and sends encrypted data to the client computer responsive to the secret being authentic.

9. A system for authenticating a user on a network using a portable token, the system comprising:
a server computer;
a client computer;
a portable token comprising:
a biometric sensor,
a display,
a processor,
a memory storing a decryption key, code for generating a secret, and biometric identity data of an enrolled user; and
the server computer, the client computer, and the portable token configured to perform the steps of:
establishing a physical connection between the portable token and the client computer on the network,
receiving, by a biometric sensor embedded on the portable token, biometric identity data of a user,
comparing the received biometric identity data against stored biometric identity data of an enrolled user,
generating a secret responsive to a match between the received biometric identity data and the stored biometric identity data of the enrolled user,
displaying the secret on the display embedded on the portable token that enables the user to input the secret using an input device of the client computer, wherein the secret is disappeared after a predetermined timeout value,
sending, by the client computer, the secret to a server,
receiving encrypted data from the server, responsive to the secret being authentic,
allowing the client computer to access the decryption key stored on the portable token only when the client computer indicates that the secret was positively identified and there is an active connection with the client computer, wherein the decryption key is stored on the portable token and never stored in any non-volatile memory of the client computer or the server computer,
accessing the decryption key located only on the token through the connection with the token, responsive to the secret being authentic and receiving encrypted data,
decrypting the encrypted data using the decryption key only while the connection with the token is active, and
displaying the decrypted data on a display of the client computer.

* * * * *